(12) United States Patent
Adam et al.

(10) Patent No.: US 7,614,845 B2
(45) Date of Patent: Nov. 10, 2009

(54) TURBOMACHINE INNER CASING FITTED WITH A HEAT SHIELD

(75) Inventors: Gerard Lucien Henri Adam, Cannes Ecluse (FR); Xavier Agneray, Veneux les Sablons (FR); Kevin Alexandre Dos Santos, Antony (FR); Son Le Hong, Thomery (FR)

(73) Assignee: Snecma, Paris (FR)

( * ) Notice: Subject to any disclaimer, the term of this patent is extended or adjusted under 35 U.S.C. 154(b) by 534 days.

(21) Appl. No.: 11/359,408

(22) Filed: Feb. 23, 2006

(65) Prior Publication Data

US 2006/0193721 A1 Aug. 31, 2006

(30) Foreign Application Priority Data

Feb. 25, 2005 (FR) .................................. 05 01921

(51) Int. Cl.
*F01D 25/26* (2006.01)
(52) U.S. Cl. ...................... 415/134; 415/173.1; 415/178
(58) Field of Classification Search ................. 415/134, 415/136, 139, 177, 178, 214.1, 173.1, 213.1
See application file for complete search history.

(56) References Cited

U.S. PATENT DOCUMENTS

| 778,699 | A | * | 12/1904 | Nelson ........................ 198/535 |
|---|---|---|---|---|
| 2,427,244 | A | | 9/1947 | Warner |
| 2,628,067 | A | | 2/1953 | Lombard |
| 4,037,751 | A | * | 7/1977 | Miller et al. ................. 428/593 |
| 4,859,142 | A | * | 8/1989 | Burke et al. ................. 415/116 |
| 5,127,794 | A | | 7/1992 | Burge et al. |
| 5,188,507 | A | * | 2/1993 | Sweeney .................. 415/173.1 |
| 5,330,321 | A | | 7/1994 | Roberts et al. |
| 5,662,457 | A | | 9/1997 | Bechtel et al. |
| 6,035,929 | A | | 3/2000 | Friedel et al. |
| 6,089,821 | A | * | 7/2000 | Maguire et al. .............. 415/115 |
| 6,412,149 | B1 | * | 7/2002 | Overberg ...................... 24/455 |
| 2005/0064918 | A1 | * | 3/2005 | Medhin ..................... 455/575.2 |

FOREIGN PATENT DOCUMENTS

| GB | 2 115 487 A | 9/1983 |
|---|---|---|
| GB | 2 327 466 A | 1/1999 |
| GB | 2 388 407 A | 11/2003 |

* cited by examiner

*Primary Examiner*—Edward Look
*Assistant Examiner*—Aaron R Eastman
(74) *Attorney, Agent, or Firm*—Oblon, Spivak, McClelland, Maier & Neustadt, L.L.P.

(57) ABSTRACT

The present invention relates to an improvement in the clearances 12 between a casing and the moving blades 11 of a rotor 1 of a turbomachine, in particular a casing provided for this purpose, and also to a turbomachine fitted with such a casing. The invention applies in particular to aircraft turbojet engines.

Figure 1:
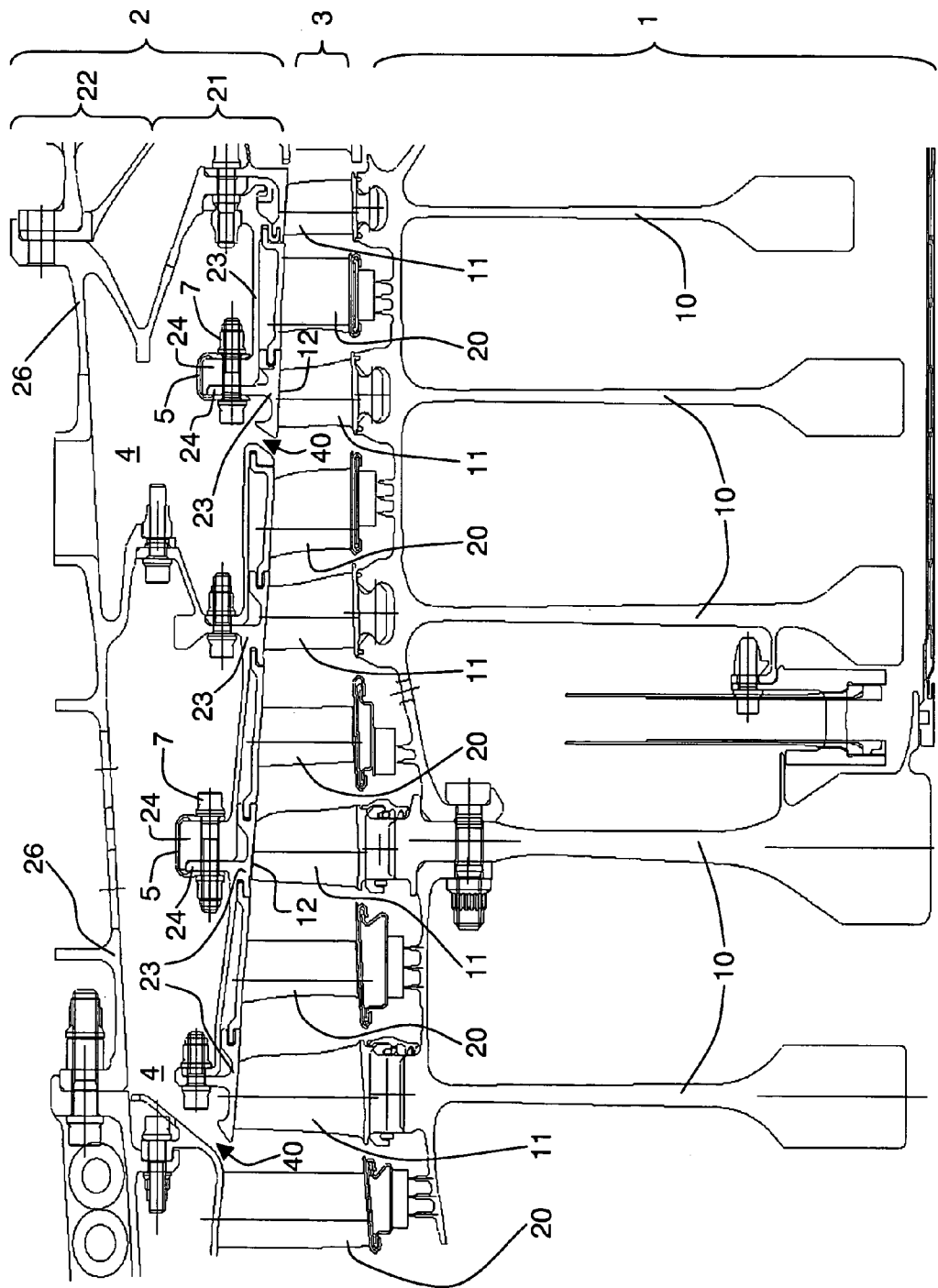

It relates more particularly to a turbomachine inner casing 21 comprising a plurality of annular shrouds 23 that are provided with flanges 24 for joining two adjacent shrouds 23 together. According to the invention, this inner casing 21 further includes:
  at least one circumferential heat shield 5 covering the flanges 24 in contact with two adjacent shrouds 23; and
  a cavity 6 filled with a first thermal insulation 8, said cavity being located between a concave internal surface 51*a*, 52*a* of the heat shield 5 and the flanges 24.
The heat shield 5 is formed by a plurality of sectors 50 joined end to end.

20 Claims, 5 Drawing Sheets

TURBOMACHINE INNER CASING FITTED WITH A HEAT SHIELD

The present invention relates to an improvement in the clearances between a casing and the moving rotor blades of a turbomachine, in particular a casing provided for this purpose, and also to a turbomachine fitted with such a casing. The invention applies in particular to aircraft turbojet engines.

Conventionally, turbomachines comprise at least one rotary assembly or rotor generally comprising a plurality of disks. Each rotor disk, provided with a plurality of blades, rotates with respect to a stationary shroud which circumferentially surrounds each of the disks. The set of shrouds with respect to the blades constitutes the inner casing of the turbomachine.

There is a clearance between the tip of a blade of a rotor disk and the facing shroud of the inner casing. Ideally, such clearances should be as small as possible in order to improve the performance of the turbomachine and its operational capability, that is to say the operation of the turbomachine without any anomaly over the entire flight envelope of the aircraft. This is because any increase in these clearances results in a significant reduction in the efficiency of the turbomachine and consequently an excessive fuel consumption. Large clearances may also cause surging during transient phases, namely during acceleration or deceleration, thus impairing the robustness of the turbomachine. Various reasons may explain these variations in clearance, in particular the mechanical and thermal operating conditions of the turbomachine.

For example, temperature variations generate differential rates of thermal expansion or contraction between the rotor and the casing. Moreover, the centrifugal forces acting on the rotor and the forces acting on the casing, especially the air pressures, create mechanical deformations. During operation of the turbomachine, there is both axial and radial displacement of the rotor and the casing.

Since the displacements of the rotor and the casing have different amplitudes and behave differently in transient, it follows that the stationary and moving parts undergo displacements over the entire operating cycle of the engine. The problems due to these effects are therefore exacerbated in turbomachine transient in which significant temperature variations and rotation speed variations of the rotor are observed.

A first case occurs when the inner casing expands more than the rotor, which results in an increase in the radial clearances. Conversely, a second case occurs when the inner casing contracts more than the rotor, which results in irreversible deterioration of the blade tips by wear and/or of the surface of the shroud and an exacerbated increase in the radial clearances upon returning to the first case. These drawbacks are deleterious to the performance and operating capability of the turbomachine.

A substantial portion of the airflow that flows through the compressor is bled off via bleed cavities adjacent the inner casing for various requirements, such as for deicing or for cooling certain components of the turbomachine or aircraft. These substantial air bleeds force the inner casing to rapidly respond from a thermal standpoint and cause it to rapidly undergo radial displacement with respect to the rotor. Since the rotor has a slow rate of displacement compared with the casing facing it, it is therefore necessary to slow down the rate of displacement of the inner casing so as to reduce the clearances in transient regimes.

Devices for improving the radial clearances of a turbomachine are known from the prior art, especially from documents U.S. Pat. No. 5,330,321, U.S. Pat. No. 6,035,929 and GB 2 388 407. However, all these devices are active devices, which means that, in order for them to operate, it is necessary to bleed off a portion of the airflow entering the turbomachine. Now, this additional bleed impairs the efficiency of the turbomachine since it is deducted from the air output by the compressor intended to work the turbine. Moreover, these devices require special modifications to be made to the turbomachine by the addition of bulky parts and/or the addition of parts that are complicated to produce on an industrial scale.

Another device for improving the radial clearances of a turbomachine is known from document U.S. Pat. No. 5,127,794. This relates to a heat shield designed to isolate the outer casing from an external airflow in order to prevent concentric deformation of the inner casing because of the stiffness of the links between the outer casing and the inner casing. This device however is unsatisfactory as it requires a redesign of the turbomachine and it cannot be fitted to existing engine models. Moreover, the heat shield described in that document, covering a plurality of stages and located on the outside of the outer casing, can have no local action, in other words no action in the immediate vicinity of the clearances, thereby reducing its effectiveness.

The object of the present invention is to remedy the drawbacks described above by providing a turbomachine inner casing comprising a plurality of annular shrouds that are provided with flanges for joining two adjacent shrouds together, which further includes:
  at least one circumferential heat shield covering the flanges in contact with two adjacent shrouds; and
  a cavity filled with a first thermal insulation, said cavity being located between a concave internal surface of the heat shield and the flanges.

Advantageously, the heat shield includes a plurality of sealing means for better effectiveness. Specifically, said heat shield has, on its concave internal surface, on the one hand, at least one projecting circumferential sealing rib directed toward the facing flange and coming into contact with said flange and/or, on the other hand, at least one transverse sealing rib that matches the shape of the facing flanges.

The heat shield according to the invention is formed by a plurality of sectors joined end to end.

The cross section of the heat shield may have a variety of shapes. It is important for the internal surface of the heat shield to be concave so that it can cover the contacting flanges of two adjacent shrouds so that a first thermal insulation is located between the concave internal surface of the heat shield and the flanges.

Given the general shape of the contacting flanges of two adjacent shrouds, the heat shield ideally has a cross section taking the form of a U.

Advantageously, the heat shield makes it possible for the undesirable effects due to excessively rapid expansion of the inner casing with respect to the rotor disk blades to be locally reduced, while harmonizing the response times and the amplitudes of displacement of the casing and the rotor.

Moreover, this advantage is achieved without any substantial structural modification of the turbomachine, it even being possible for the heat shield according to the invention to be fitted onto existing turbomachine models.

Another benefit of the invention lies in the simplicity of its installation on a turbomachine, in particular thanks to the construction of the heat shield by means of a plurality of sectors.

The invention also relates to a turbomachine fitted with an inner casing comprising at least one such heat shield.

The invention will be clearly understood and its advantages will become more apparent on reading the detailed description that follows.

Figure 2:
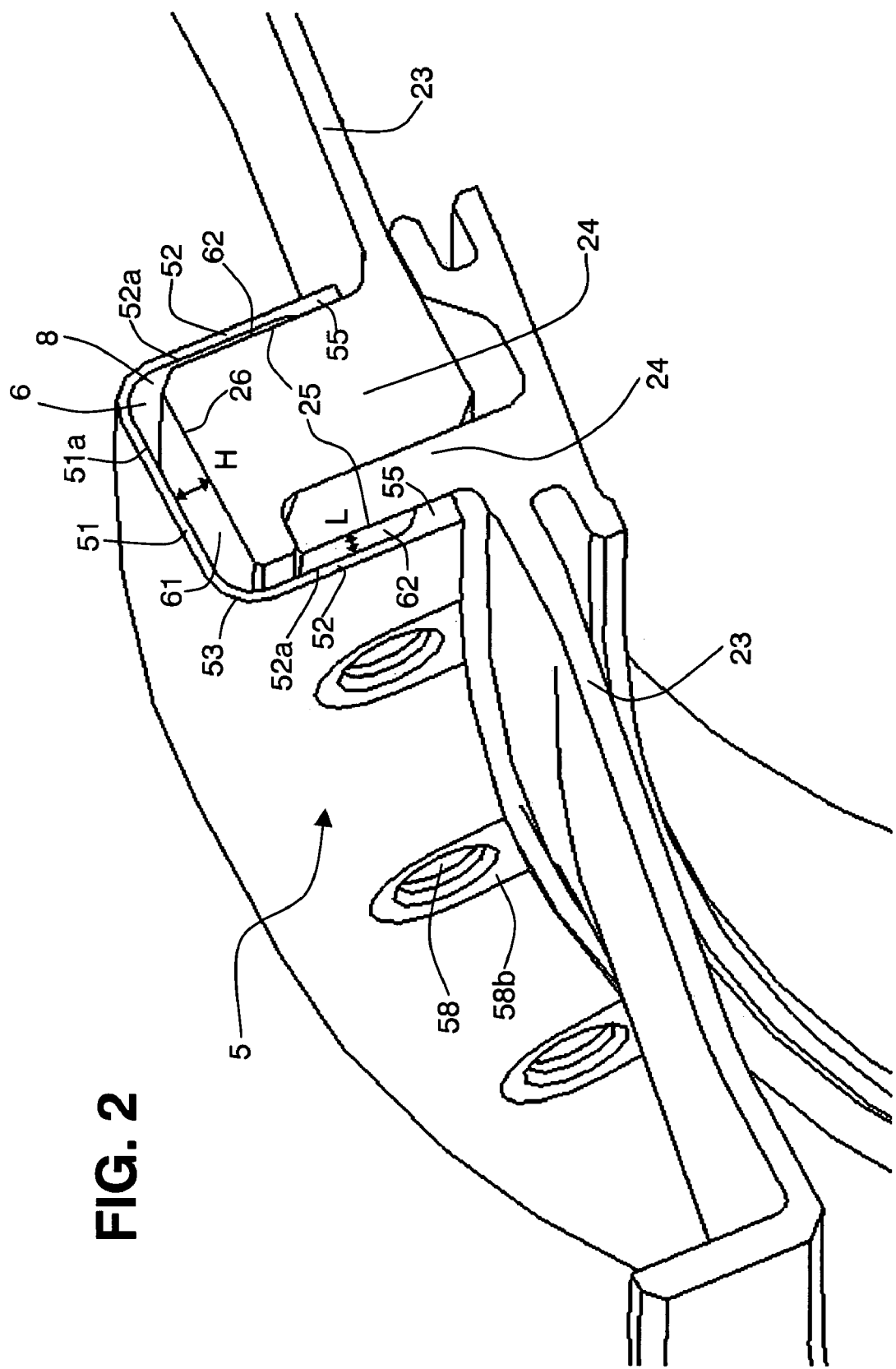
Figure 3:
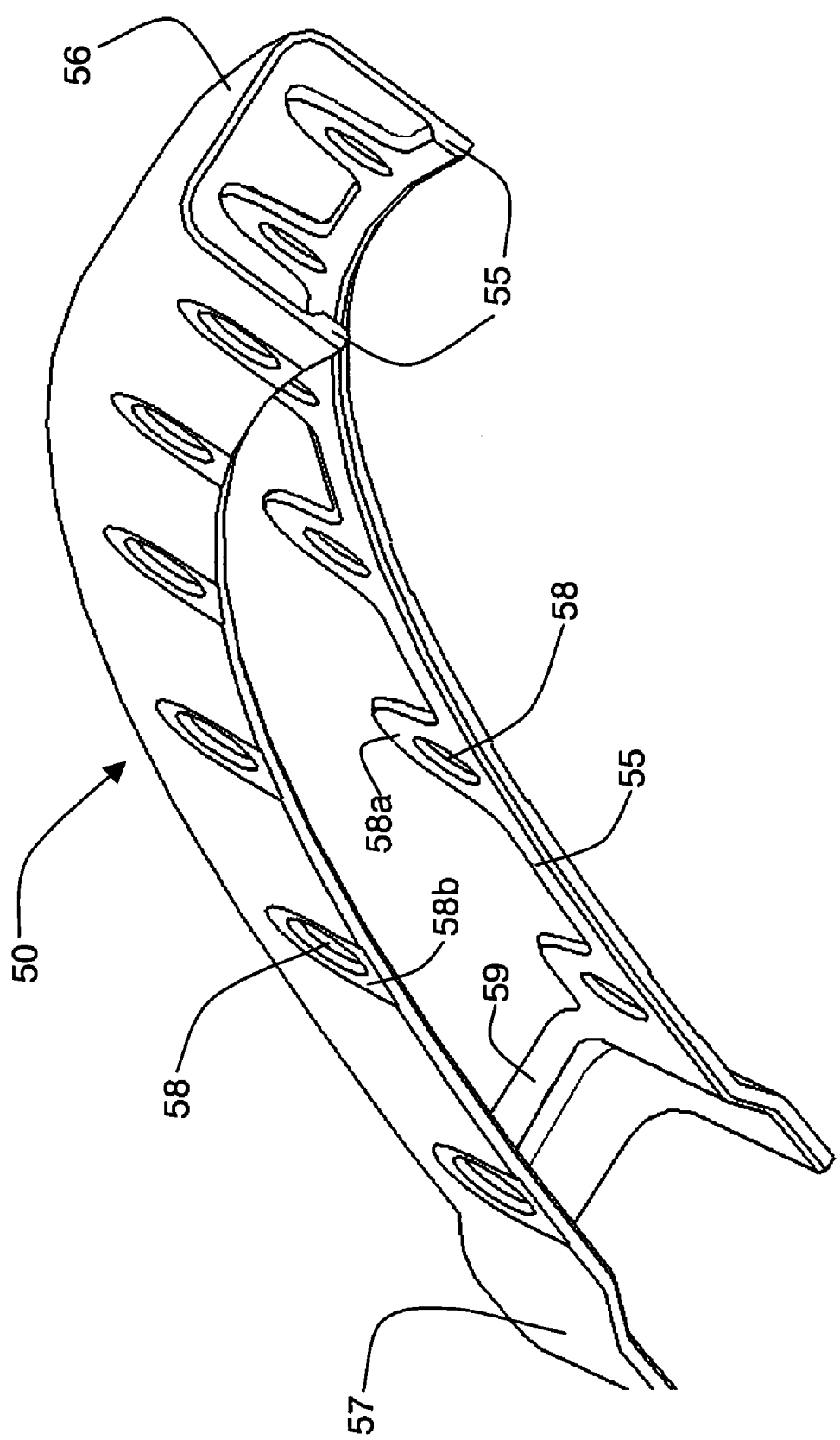
Figure 4:
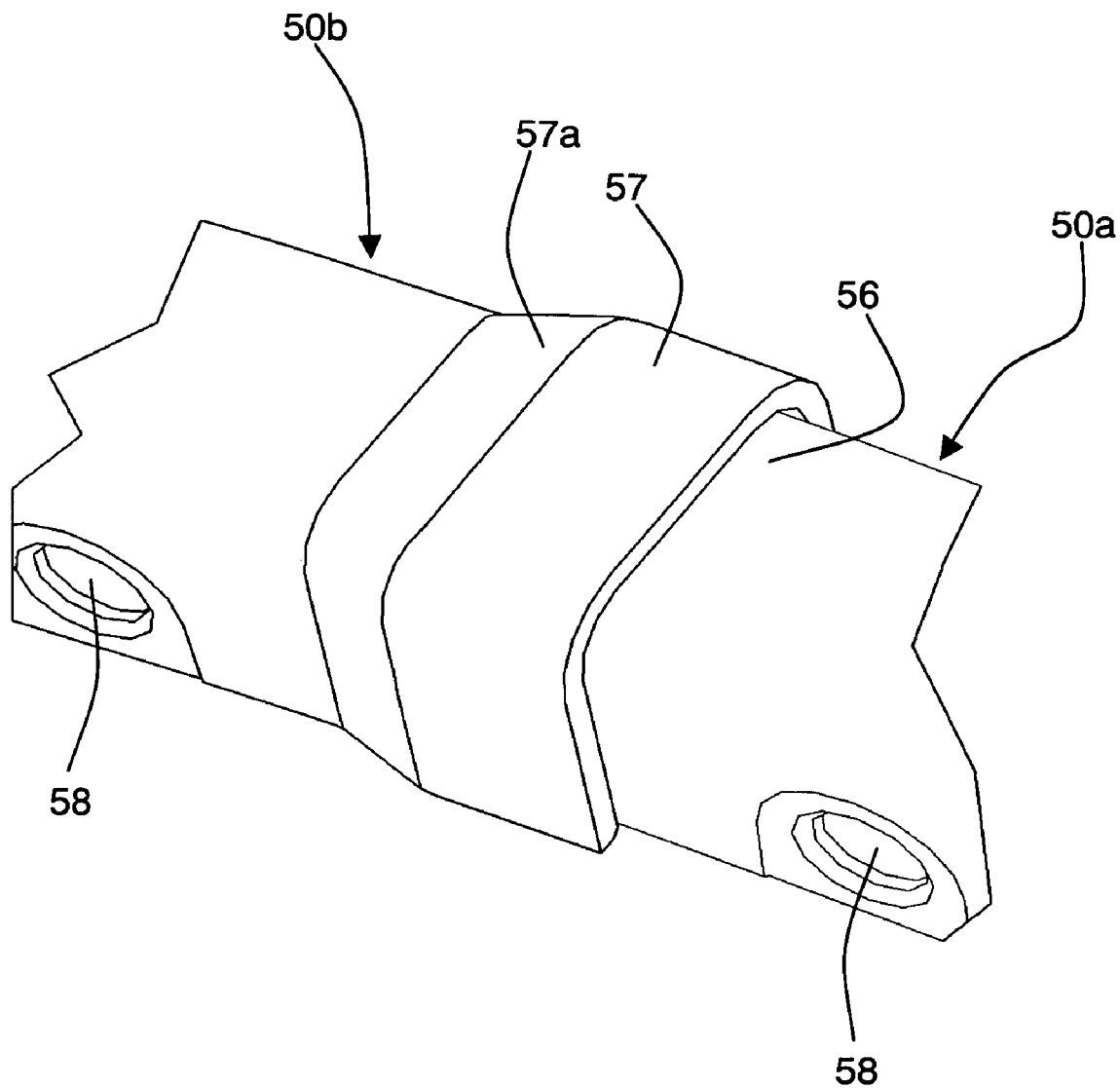
Figure 5:
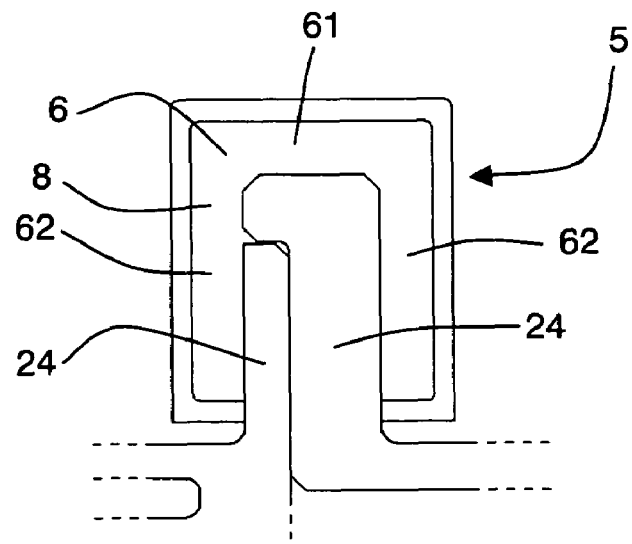
Figure 6:
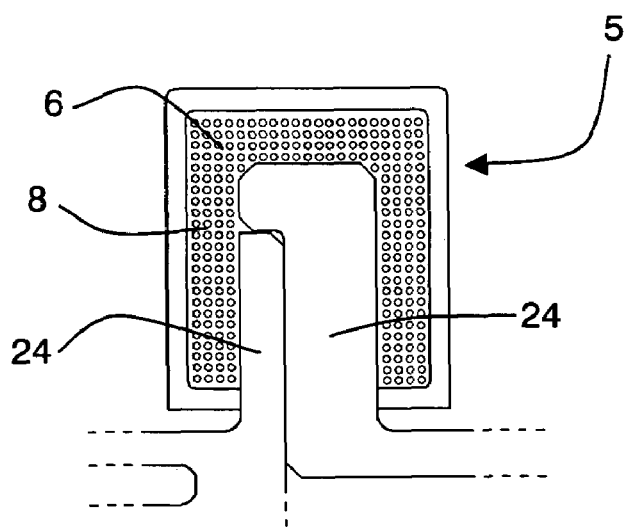
Figure 7:
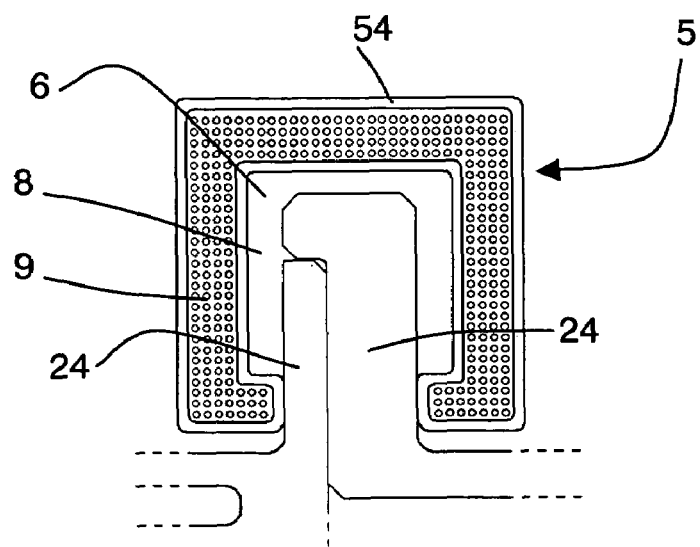

The description refers to the appended drawings, which show respectively:

FIG. 1, a sectional view of the downstream part of the high-pressure compressor of a turbomachine;

FIG. 2, a perspective cross-sectional view of two adjacent shrouds of an inner casing having a heat shield according to a first embodiment of the invention;

FIG. 3, a perspective view of one of the sectors making up the heat shield according to the invention;

FIG. 4, a perspective partial view of the overlap region of two adjacent sectors making up the heat shield according to the invention;

FIG. 5, a sectional view of a first embodiment of the heat shield according to the invention;

FIG. 6, a sectional view of a second embodiment of the heat shield according to the invention; and FIG. 7, a sectional view of a third embodiment of the heat shield according to the invention.

FIG. 1 illustrates a turbomachine rotary assembly or rotor 1 comprising a plurality of rotor disks 10. Each rotor disk 10 corresponds to one compressor stage and is provided with a plurality of blades 11 arranged radially on the outer periphery of each disk 10.

Stationary blades, called vanes 20, are inserted between each moving blade 11 of the compressor and constitute a stator which is fastened to a casing 2, which is also stationary. The casing 2 comprises an inner casing 21 and an outer casing 22. The inner casing 21 consists of a plurality of axially adjacent annular shrouds 23 joined together. Each rotor disk 10 provided with blades 11 can rotate relative to a shroud 23 that circumferentially surrounds each of the disks. The set of adjacent shrouds 23 placed facing the blades constitutes the inner casing 21 of the turbomachine.

The outer casing 22 is formed by another set of annular shrouds 26 of essentially greater diameter than the annular shrouds 23 of the internal part 21 of the casing 2 in any one plane orthogonal to the rotation axis of the turbomachine so that a plurality of bleed cavities 4 are defined between the inner casing 21 and the outer casing 22.

The radial clearances 12 are between each blade tip 11 of each rotor disk 10 and a facing shroud 23 constituting the skin of the inner casing 21, the skin of the inner casing reconstituting part of the aerodynamic airflow 3.

A substantial portion of the airflow that flows through the compressor is bled off for various purposes. The bleed air coming from the compressor runs into bleed cavities 4 via openings 40 in the inner casing 21. These substantial air bleeds force the inner casing 21 to rapidly respond from a thermal standpoint and cause it to rapidly undergo radial displacement with respect to the rotor 1. Since the rotor 1 has a slow rate of displacement compared with the casing facing it, it is necessary to slow down the rate of displacement of the inner casing 21 so as to reduce the clearances 12 in transient regimes.

FIG. 1 shows that the clearances 12 lie in the immediate vicinity of the intersection between two adjacent shrouds 23. The shrouds 23 are fastened together by means of their flanges 24, which essentially extend radially outward with respect to the rotation axis of the turbomachine, that is to say toward the adjacent bleed cavities 4. Moreover, the intersection region between two adjacent shrouds 23 is more sensitive to its thermal environment the less massive the components forming the intersection. The heat shield 5 is effective in the regions where the problems associated with the radial clearances 12 occur.

Of course, the example illustrated by the FIG. 1 relating to a high-pressure compressor of a turbomachine is not limiting since the invention may be implemented on any part of the turbomachine where the same problems occur.

FIG. 2 illustrates the action of the heat shield 5 according to the invention. The heat shield 5 is in the form of a circumferential profile and covers the contacting flanges 24 of two axially adjacent shrouds 23. The heat shield 5 has a concave internal surface 51a, 52a and a convex external surface 53. Moreover, a cavity 6 filled with a first thermal insulation 8 lies between the concave internal surface 51a, 52a of the heat shield 5 and the flanges 24.

For the purpose of the present invention, the term "profile" is understood to mean a component of substantially elongate shape having a cross section, of particular outline, which is substantially constant over its entire length.

Owing to the general shape of the contacting flanges 24 of two adjacent shrouds 23, the ideal shape of the cross section of the heat shield 5 takes the form of a U. Since it is desirable for the heat shield 5 to cover the contacting flanges 24 of two adjacent shrouds 23 and for there to be a cavity 6 placed between the concave internal surface 51a, 52a of the heat shield 5 and the flanges 24. A person skilled in the art may imagine a multitude of shapes for achieving the same result. For example, it is conceivable to design a cross section in the form of a "horseshoe", or an open ring or oval.

When the profile is in particular in the form of a U, the cavity 6 is formed, on the one hand, by pockets 62 between the arms 52 of the U and the facing flanges 24 and/or, on the other hand, by a circumferential housing 61 between the base 51 of the U and the facing flanges 24. The flanges 24 are therefore entirely isolated from the bleed cavities 4.

In a first embodiment, as shown in FIGS. 2 and 5, the first thermal insulation 8 filling the cavity 6 may be inert air. The radial surfaces 25 and the circumferential surface 26 of the flanges 24 are thus essentially in contact with inert air in the pockets 62 and/or the circumferential housing 61. The flanges 24 are thus essentially subject to natural convective heat exchange instead of forced convective heat exchange. Without this heat shield 5, the flanges 24 would be immersed directly in the bleed cavity 4. To make the heat shield 5 more effective, the air has to be as inert as possible, in other words air that is not moving with respect to the stationary parts.

In a second embodiment, as shown in FIG. 6, the first thermal insulation 8 filling the cavity 6 may also be glass fiber or a felt of silica wool or any other material known for its thermal insulation capability.

In a third embodiment, as shown in FIG. 7, the heat shield 5 may be formed by an envelope 54 filled with a second thermal insulation 9, which may be glass fiber or a felt of silica wool or any other material known for its thermal insulation capability. The envelope 54 may consist of a flexible metal sheet. The external shape of this heat shield 5 is then substantially identical to the heat shields 5 of the other two embodiments presented above, a first thermal insulation 8 filling the cavity 6. Preferably, this first thermal insulation 8 is inert air.

The concave internal circumferential surface 51a defined by the base 51 of the U of the heat shield 5 according to the invention must have a minimum internal radius, with respect to the rotation axis of the turbomachine, which is greater than the maximum radius of the circumferential surface 26 of the flanges 24 so as to obtain a continuous circumferential cavity that isolates the flanges 24 from the bleed cavity 4. Depending on the requirements and the options, the distance between these aforementioned radii, which define a height H, may vary. The greater this height H, the more effective the heat shield 5 according to the invention will be.

Likewise, the larger the width L of the pockets 62, which is defined by the distance between the concave internal surface 52a of the arms 52 of the U and the radial surfaces 25 of the facing flanges 24 of said arms 52 of the U, the more effective the heat shield 5 according to the invention will be. Likewise, again depending on the requirements and the options, the width L may vary.

To prevent the air in the bleed cavity 4 from penetrating right into the pockets 62 via the end of the arms 52 of the U at the shoulder of the flanges 24, the heat shield 5 includes, on its concave internal surface, on at least one end of an arm 52 of the U, a circumferential sealing rib 55, said rib 55 projecting toward the facing flange 24 and in contact with the latter.

Likewise, to prevent the air in the bleed cavity 4 from penetrating right into the circumferential housing 61, the heat shield 5 has, on the concave internal surface 51a, 52a of the U, a transverse sealing rib 59 that matches the shape of the facing flanges 24.

One particularly advantageous feature of the heat shield 5 lies in the fact that it is formed by a plurality of sectors 50, the sectors 50 being joined end to end. Preferably, the sectors 50 are identical, thereby simplifying the manufacture of the heat shield 5.

For example, if the heat shield 5 consists of 45° angular sectors, eight sectors 50 are needed to cover the set of flanges 24 located over the entire shroud. Of course, this example is not limiting, it being possible to envision numerous alternative versions thereof.

Each sector 50 has a first end 56 and a second end 57. The cross section of the profile is essentially constant over the entire length of the sector 50, including the first end 56. Only the cross section of the second end 57 is distinguished from the rest of the sector 50 over a relatively short length compared with the total length of said sector 50. This length represents about 5% of the total length of said sector 50 in the example illustrated by FIG. 3. Specifically, the second end 57 has a cross section larger in size than the cross section of the first end 56, the second end 57 of a second sector 50b overlapping the first end 56 of a first sector 50a adjacent the second sector 50b, as illustrated in FIG. 4.

Because of the flow of compressed air due to the rotation of the rotor blades 11, the outflow of the bleed air generally has a tangential component flowing circumferentially in the bleed cavities 4. In the overlap region between two adjacent sectors 50a and 50b, illustrated in FIG. 4, the concave internal surface of the second sector 50b matches the convex external surface of the first sector 50a so as to limit the leakage between each sector 50. This feature of the invention thus prevents the effectiveness of the heat shield 5 from being degraded by the circumferential flow of the bleed air, the thermal insulation 8 having to remain the most insulating possible. In the overlap region, the ends of two adjacent sectors 50a and 50b are joined together by a short portion of variable section 57a of the sector 50b.

Again for the purpose of increasing the effectiveness of the invention, the overlap of the first ends 56 by the second ends 57 must preferably take into account the direction of circumferential flow of the bleed air. In particular, the sectors 50 must be placed around the flanges 24, the first end 56 of each sector 50 being located downstream of the circumferential airflow and the second end 57 of each sector 50 being located upstream thereof, so that the bleed air flows from the first end 56 to the second end 57 of any one sector 50, thereby preventing this heat shield 5 from becoming a scoop for the bleed air.

Each sector 50 is fastened to the flanges 24 by means of bolts 7. Each sector 50 thus includes a plurality of circular holes 58 for fastening the sector 50 to the flanges 24 by bolts 7. In FIG. 3, circular holes 58 on each arm 52 of the U face each other so as to allow fastening by the bolts 7 passing both through the heat shield 5 and the flanges 24 in the axial direction, as illustrated in FIG. 1.

Moreover, each sector 50 includes, on its concave internal surface 51a, 52a, at each circular hole 58, a bearing surface 58a that projects toward the surface of the flange 24 facing it.

Each sector also includes, on its convex external surface 53, at each circular hole 58, a counterbore 58b for receiving one end of a bolt 7.

We claim:

1. A turbomachine inner casing comprising:
   a plurality of annular shrouds that are provided with flanges for joining two adjacent shrouds together, which further includes:
   at least one circumferential heat shield covering the flanges in contact with two adjacent shrouds; and
   a cavity filled with a first thermal insulation, said cavity being located between a concave internal surface of the heat shield and the flanges,
   wherein an outermost surface of the heat shield sandwiching the cavity between the heat shield and the flanges is free of holes, and
   the outermost surface of the heat shield directly faces the flanges in a radial direction.

2. The turbomachine inner casing as claimed in claim 1, wherein the heat shield includes, on its concave internal surface, at least one projecting circumferential sealing rib directed toward the facing flange and coming into contact with said flange.

3. The turbomachine inner casing as claimed in claim 1, wherein the heat shield includes, on its concave internal surface, at least one transverse sealing rib that matches the shape of the facing flanges.

4. The turbomachine inner casing as claimed in claim 1, wherein the heat shield is formed by a plurality of sectors joined end to end.

5. The turbomachine inner casing as claimed in claim 4, wherein the sectors are identical.

6. The turbomachine inner casing as claimed in claim 4, wherein each sector includes a plurality of circular holes configured to fasten the sector to the flanges by bolts.

7. The turbomachine inner casing as claimed in claim 6, wherein each sector includes, on its concave internal surface, radially aligned with each circular hole, a bearing surface that projects toward the surface of the flange facing it.

8. The turbomachine inner casing as claimed in claim 6, wherein each sector includes, on its convex external surface, radially aligned with each circular hole, a counterbore for receiving one end of a bolt.

9. The turbomachine inner casing as claimed in claim 1, wherein the heat shield has a cross section in the form of a U provided with a base and with two arms.

10. The turbomachine inner casing as claimed in claim 9, wherein the cavity is formed by pockets between the arms of the U and the flanges facing said arms of the U.

11. The turbomachine inner casing as claimed in claim 9, wherein the cavity is formed by a circumferential housing between the base of the U and the flanges facing said base of the U.

12. The turbomachine inner casing as claimed in claim 1, wherein the first thermal insulation is chosen from inert air, glass fiber and silica wool felt.

13. The turbomachine inner casing as claimed in claim 1, wherein the heat shield is formed by an envelope filled with a second thermal insulation.

14. The turbomachine inner casing as claimed in claim 13, wherein the second thermal insulation includes at least one of glass fiber or silica wool felt.

15. The turbomachine inner casing as claimed in claim 13, wherein the envelope consists of a flexible metal sheet.

16. The turbomachine inner casing as claimed in claim 13, wherein the first thermal insulation is inert air.

17. A turbomachine fitted with an inner casing as claimed in claim 1.

18. A turbomachine inner casing comprising:
a plurality of annular shrouds that are provided with flanges for joining two adjacent shrouds together, which further includes:
at least one circumferential heat shield covering the flanges in contact with two adjacent shrouds, and
a cavity filled with a first thermal insulation, said cavity being located between a concave internal surface of the heat shield and the flanges,
wherein said heat shield is formed by a plurality of sectors joined end to end; and
each sector has a first end and a second end, the second end having a cross section larger in size than the cross section of the first end, the second end of a second sector overlapping the first end of a first sector adjacent the second sector.

19. The turbomachine inner casing as claimed in claim 18, wherein, in the overlap region between two adjacent sectors, the concave internal surface of the second sector matches the convex external surface of the first sector.

20. The turbomachine inner casing as claimed in claim 18, wherein the sectors are placed end to end around the flanges, the first end of each sector being located downstream of a circumferential airflow and the second end of each sector being located upstream thereof, the circumferential flow of air flowing around the inner casing.

* * * * *